US010136300B2

(12) United States Patent
Bonnet et al.

(10) Patent No.: US 10,136,300 B2
(45) Date of Patent: *Nov. 20, 2018

(54) METHOD OF ESTABLISHING A CONNECTION BETWEEN A MOBILE COMMUNICATING OBJECT AND A REMOTE SERVER

(71) Applicant: EDEVICE, Merignac (FR)

(72) Inventors: Fabrice Bonnet, Merignac (FR); Stephane Gomes, Merignac (FR); Stefan Gonnet, Merignac (FR); Stephane Schinazi, Merignac (FR)

(73) Assignee: EDEVICE, Merignac (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,942

(22) Filed: Jan. 9, 2018

(65) Prior Publication Data

US 2018/0132094 A1 May 10, 2018

Related U.S. Application Data

(63) Continuation of application No. 15/034,468, filed as application No. PCT/FR2013/052628 on Nov. 5, 2013, now Pat. No. 9,973,918.

(51) Int. Cl.
H04W 8/00 (2009.01)
H04W 76/00 (2018.01)
(Continued)

(52) U.S. Cl.
CPC ............ H04W 8/06 (2013.01); H04W 36/14 (2013.01); H04W 48/18 (2013.01); H04W 76/10 (2018.02); H04W 76/18 (2018.02)

(58) Field of Classification Search
CPC ..... H04W 36/14; H04W 48/16; H04W 48/18; H04W 60/00; H04W 88/06
See application file for complete search history.

(56) References Cited

U.S. PATENT DOCUMENTS 5,475,677 A * 12/1995 Arnold ................. H04B 1/005
370/280
6,650,649 B1 11/2003 Muhammad et al.
(Continued)

FOREIGN PATENT DOCUMENTS

EP 2048910 A1 4/2006
EP 1986372 10/2008
(Continued)

OTHER PUBLICATIONS

International Search Report for International Application No. PCT/FR2013/052628 dated Apr. 15, 2014, 3 pages.
(Continued)

Primary Examiner — Sharad Rampuria
(74) Attorney, Agent, or Firm — TraskBritt

(57) ABSTRACT

The present invention relates to a method of establishing a connection between a mobile communicating object and a remote server, by way of a mobile communication network where the communicating object has a list encompassing a determined number of preferred mobile communication networks with which the object can be made to connect. The method comprises a first step where the communicating object establishes a radio connection with one of the networks available so as to transmit a first series of audit information (such as quality of signal, error rate, base station cell identifier) to the remote server, a step of verification by the server of the data received and, in the event of anomaly, of engagement of a procedure for modifying the selection of the mobile communication network to which the mobile object is connected.

20 Claims, 1 Drawing Sheet

(51) Int. Cl.
*H04W 8/06* (2009.01)
*H04W 36/14* (2009.01)
*H04W 48/18* (2009.01)
*H04W 76/18* (2018.01)
*H04W 76/10* (2018.01)

(56) References Cited

U.S. PATENT DOCUMENTS

| | | | |
|---|---|---|---|
| 8,194,646 B2 | 6/2012 | Elliott et al. | |
| 9,674,868 B2 | 6/2017 | Alex et al. | |
| 2005/0157677 A1 | 7/2005 | Dowling | |
| 2006/0221903 A1* | 10/2006 | Kauranen | H04W 36/14 370/331 |
| 2009/0207812 A1* | 8/2009 | Gupta | H04W 36/0094 370/332 |
| 2010/0279733 A1 | 11/2010 | Karsten et al. | |
| 2011/0295940 A1 | 12/2011 | Saleem et al. | |
| 2014/0075567 A1 | 3/2014 | Raleigh et al. | |
| 2014/0098671 A1* | 4/2014 | Raleigh | H04L 69/14 370/235 |
| 2016/0095518 A1 | 4/2016 | Convents et al. | |
| 2016/0353273 A1 | 12/2016 | Bonnet et al. | |

FOREIGN PATENT DOCUMENTS

| | | |
|---|---|---|
| FR | 2949179 A1 | 2/2011 |
| WO | 2005048631 A1 | 5/2005 |
| WO | 2005115039 | 12/2005 |
| WO | 2007015574 A1 | 2/2007 |
| WO | 2008000914 A1 | 1/2008 |

OTHER PUBLICATIONS

International Written Opinion for International Application No. PCT/FR2013/052628 dated Apr. 15, 2014, 20 pages (with translation).

* cited by examiner

| IP Header | UDP Header | 00198933201011020353114 | 010526080 | 020217 | 03010 |

| IP Header | UDP Header | 00198933201011020353114 | 010526080 |

METHOD OF ESTABLISHING A CONNECTION BETWEEN A MOBILE COMMUNICATING OBJECT AND A REMOTE SERVER

CROSS-REFERENCE TO RELATED APPLICATIONS

This application is a continuation of U.S. patent application Ser. No. 15/034,468, filed Aug. 16, 2016, now U.S. Pat. No. 9,973,918, issued May 15, 2018, which application is a national phase entry under 35 U.S.C. § 371 of International Patent Application PCT/FR2013/052628, filed Nov. 5, 2013, designating the United States of America and published in French as International Patent Publication WO 2015/067858 A1 on May 14, 2015, the disclosure of each of which is hereby incorporated herein in its entirety by this reference.

TECHNICAL FIELD

The present disclosure relates to the field of access to services from mobile equipment such as a mobile telephone or interactive equipment dialoguing with remote equipment by means of a public land mobile network (PLMN). More precisely, the disclosure relates to:

- communication between electronic equipment of the "M2M" (machine-to-machine) type,
- international roaming enabling a subscriber of an operator to access their mobile telephony service (voice or data) from various networks during movement resulting from the fact that the GSM mobile network at all times keeps information on the location area of the mobile subscriber in a country different from that of the operator,
- in particular in the case of the cell used for a fixed apparatus (but not solely).

GSM networks, as is known, enable authorized users to access various services (telephony, messaging, data transmissions, broadcasts of audiovisual contents, etc.) in a mobility situation from portable terminals. Depending on the country and the operator, it may be based on various standardized architectures, such as CSM, CDMA and UMTS in particular.

In the majority of countries, there exist a plurality of public land mobile networks (PLMNs) that are operated by different operators. They are generally interconnected with each other, which makes it possible to establish communications between terminals registered on different mobile networks. They are also interconnected with the switched telephone network (STN or "fixed network"), which makes it possible to establish communications between mobile terminals and fixed terminals.

The choice of the network is made either manually by a selection among the networks appearing to be available on the mobile equipment, or more generally automatically according to rules fixed by the main operator with which the user has taken out a subscription, and agreements made between this main operator and the operators of the local PLMN.

BACKGROUND

In the majority of products installing a cellular module of the GSM/GPRS/3G/4G type, the selection of the GSM (PLMN) carrier is processed automatically by the radio module. In this automatic mode, the selection of the GSM carrier is completely managed by the radio module. This solution is practical since it deals with situations such as the search for an operator in a new country (roaming) or makes it possible to pass to another operator when coverage is lost.

Manual or automatic selection according to rules fixed by the main operator is not the only solution.

In the prior art the French patent FR 2949179 is known, which describes a method for establishing a connection between a mobile communicating object and a mobile communication network where the communicating object has list containing a given number of preferred mobile communication networks with which the object can connect. This list comprises a plurality of sub-lists of networks (PLMNs) hierarchized so that the networks (PLMNs) included in a sub-list are preferred to all the networks included in the sub-lists of higher rank.

This method of the prior art comprises the steps consisting of:

- detecting available networks
- if at least one of the detected networks belongs to the list, connecting to the preferred network among the detected networks, the preferred network being the network belonging to the sub-list with the lowest rank
- if the preferred network among detected belongs to a sub-list of rank n higher than or equal to 2:
  - i) seeking the availability of new networks at regular intervals;
  - ii) if one or more networks belonging to one of more sub-lists of rank lower than or equal to n are detected as being available, connecting to the detected network belonging to the sub-list of lowest rank.

In the prior art the American Patent Publication US 2009/0207812 is also known, describing a method for switching a device from a source network to a target network, the source network being one from a WiMAX network and a 3GPP network and the target network being another WiMAX network and the 3GPP network, comprising reception information coming from the device on the source network and on the target network. The information received from the device may be supervised in order to determine whether the parameters of the network of the source have passed an intercell transfer threshold. The information received from the device may also be checked in order to determine whether the parameters of the target network are suitable for a transfer.

The international patent WO 2008/000914 is also known, proposing a solution for measuring an adjacent cell and signaling in a multiple radio access technology (RAT) environment.

User equipment (UE) carries out measurements of adjacent cells with an inter-radio access technology (RAT) during a standby mode of the UE. The results of inter-RAT measurements may be stored in an internal memory of the UE during the standby mode. When the UE triggers an establishment of the connection, a report on inter-RAT measurements containing results of inter-RAT measurements obtained during the standby mode is sent to the network when the connection is established. Consequently the inter-RAT measurement information is immediately available for a network decision at the commencement of the connected mode. For example, an inter-RAT inter-cell transfer may be decided on and implemented without delay, on the basis of the inter-RAT measurement made in advance during the standby mode and signaled when the connection is established.

The prior art also comprises the European patent EP 1986372 describing a method and apparatus for supporting a transfer between heterogeneous access networks, in which user equipment information and the candidate access network information are detected, a transfer decision is evaluated on the basis of the information on the user equipment and the candidate access network information, and an access network is chosen from a plurality of candidate access networks on the basis of the inter-cell transfer decision.

The international patent WO 2005/115039 relates to a method for transferring a communication established between a radio-communication terminal and a first radio-communication system, to a second radio-communication system. For transmitting information, the first radio-communication system uses a first radio-communication standard and the second radio-communication system uses a second radio-communication standard. The radio-communication terminal monitors not only the adjacent radio cells of the first radio-communication system but also the adjacent radio cells of the second radio-communication system by measurements and transmits the valid measured signal levels of the monitored radio cells of the first and second radio-communication systems to a monitoring device on the network side. In the case where the measured signal levels are occasionally not formed during the monitoring of the radio cells by the second radio-communication system, the radio-communication terminal transmits predetermined signal levels to the monitoring device. The radio-communication terminal uses a symbol that enables the network to distinguish the valid measured signal levels from the predetermined signal levels. When the communication transfer is demanded by the monitoring device, only the valid measured signal levels are taken into consideration.

The solutions of the prior art lead to a selection of the network of the PLMN according to criteria taking into account mainly the commercial agreements between the operators and the power of the radio signal received locally.

However, for some applications, other criteria are preponderant: availability of certain accesses (TCP ports for example) for specific data transmissions. By way of example, such applications concern the remote transmission of medical data, for example, by a patient equipped with biomedical sensors, such as a health parameter measurement apparatus (weight, pulse, blood pressure, blood oxygenation level, glucose monitor), automatically triggering the sending of digital data via the mobile network to a server center.

The selection made in accordance with the prior art does not make it possible to favor the most appropriate network and this may lead to serious situations of unavailability of the service because of an inappropriate selection of the network.

In some cases, the radio module is registered with the GSM networks on which:
Only the GSM voice service is adopted when the product requires a GPRS service. GPRS is not supported by the operator.
GPRS is adopted, but access to the APN to recover an IP address is not possible (temporary unavailability, agreement problems, etc.).
An IP address is attributed to the product, but IP communication is not possible (defective equipment on the pathway (router) etc.).
The charging rate is not suited to the application.
Maintenance operations leading to the unavailability of the service are planned.
The network chosen is the one that has the strongest signal but is also the one that is the most saturated.
The network chosen was indeed the most suitable at the time of choice, but the quality of the radio signal has dropped without the module changing network.

Registration to these networks according to the solutions of the prior art is therefore a problem when the product needs GSM/GPRS/3G/4G access.

Moreover, in the solutions proposed in the prior art, it is the server that controls the selection of the network from criteria predefined in this server.

BRIEF SUMMARY

The present disclosure aims to remedy this aforementioned drawback by proposing a method for establishing a connection between a mobile communicating object and a remote server, by means of a mobile communication network where the communicating object has a list containing a given number of preferred mobile communication networks with which the object can be made to connect, characterized in that it comprises:
 a first step where the communicating object establishes a radio connection with one of the available networks in order to transmit a first series of information to the remote server,
 a step of verification by the server of the data received and, in the event of an anomaly, engagement of a procedure of dynamic modification of the selection of the mobile communication network to which the mobile object is connected.

Advantageously, the remote server awaits, in standby mode, the incoming UDP messages coming from the mobile communicating object integrating a GSM module, and, when a UDP message is received, the server attempts to identify the sending mobile communicating product by the recovery of a unique serial number (such as the SIMID field).

This solution affords a functionality of selecting another PLMN network when the mobile communicating object does not receive an acknowledgement of receipt validating the IP link. This feature has the advantage of providing autonomy of the mobile communicating object with respect to the remote server.

According to a preferred embodiment, the method according to the disclosure comprises a step of checking by the server as to whether the identified communicating product is recorded in its internal registers (database, files, etc.), and whether a PLMN is specified as the preferred PLMN, the step being executed after the identification of a connected mobile object.

Preferably, if the specified preferred PLMN network is the same as the one used for sending the incoming message, the server acknowledges receipt of an incoming message in order to indicate to the communicating mobile object that the IP connection is functioning correctly and that no change in network is necessary.

Preferably, if the specified preferred PLMN network is different from the one used for sending the incoming message, the server acknowledges receipt of the incoming message in order to indicate to the remote apparatus that the IP connection is functioning correctly, and specifies an item of information on the new PLMN network that the mobile communicating object must select.

Advantageously, if the communicating object does not receive an acknowledgement of receipt from the server validating the IP connection after the establishment of a communication from a first PLMN network, the radio module selects another available PLMN network and recommences the same procedure.

BRIEF DESCRIPTION OF THE DRAWINGS

The disclosure will be understood better from a reading of the following detailed description, referring to a non-limitative example embodiment illustrated by the accompanying drawings, where.

DETAILED DESCRIPTION

Figures 1, 2, 3:
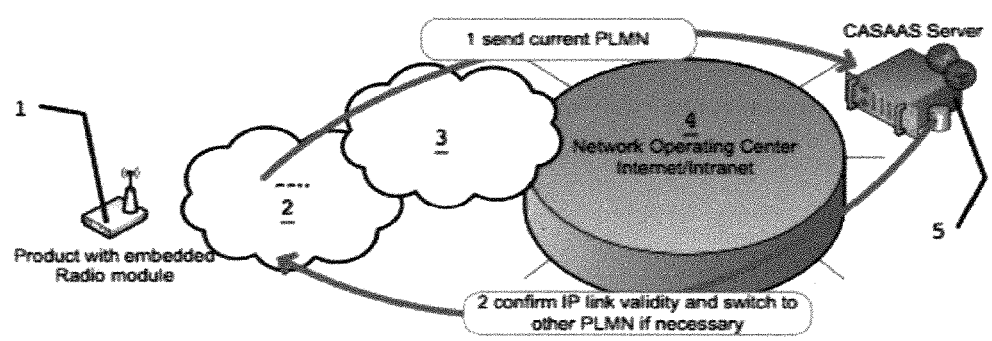
FIG. 1 depicts an outline diagram of the exchanges between the mobile equipment, the server and the public network
FIG. 2 depicts an example of a UDP signal frame sent by the CASAAS (carrier selection as a service) client equipment
FIG. 3 depicts an example of a UDP signal frame received by the CASAAS client.

Referring to FIG. 1, mobile equipment 1 comprises, in a known manner, a radio module and an antenna. This radio module contains a normal GSM/GPRS means for establishing a connection with a GSM network 2 and a GPRS network 3 by means of network infrastructures 4.

The disclosure also uses a so-called CASAAS (carrier selection as a service) server 5.

The mobile equipment may, by way of non-limitative example, be telemedicine equipment comprising a GSM module, which will make it possible to monitor the heart rate of a person at risk and to trigger a procedure in the event of a risk of a heart attack, or telemedicine equipment for assisting diabetics in monitoring their glycemia and triggering remote assistance in the event of a problem.

The GSM module is associated with a subscription card or a subscription identifier (in the case of CDMA for which there is no SIM), for example, a SIM card, provided by an operator, the information of which controls the radio module, in particular for selecting the network.

The signals transmitted are digital signals, requiring access to dedicated ports that are not always available.

The solution proposed by the present disclosure consists of using a higher-level algorithm for selecting a GSM operator. This algorithm replaces the algorithm of the radio module for the automatic selection of the operator.

It uses a CASAAS server that tests the IP link during a connection by a communicating mobile object and controls a procedure of selecting another operator in the event of failure.

A CASAAS client is incorporated in the communicating mobile object. It may be launched at a given moment, such as the start-up of the product, the request for a new connection or in standby mode.

As soon as a PLMN network has been selected by the radio module, the CASAAS client sends a message to the CASAAS server comprising the identifier of the PLMN network used. Optionally a plurality of CASAAS server addresses may be used for redundancy purposes.

If the CASAAS client does not receive an acknowledgement of receipt, the IP link on this PLMN has not been validated by the CASAAS server. It then controls the radio module to connect via the next available PLMN network, and then restarts the process by sending a new message.

If the CASAAS client receives an acknowledgement of receipt, it considers that the IP link on this PLMN has been validated by the CASAAS server. This message sent by the CASAAS server indicates whether the PLMN network used is appropriate or whether another PLMN network must be selected.

If the CASAAS server demands the selection of another network, the CASAAS client keeps the trace of this information in order to reuse it during a future connection. The IP link, validated by the recognition of the CASAAS product, is next used for the data exchange between the user and the server before passing to the selection of the new PLMN.

When the product demands the change of PLMN network, it controls the radio module in order to select the new PLMN network.

Once the new PLMN network is ready for use by the module, the CASAAS client sends a new message to the CASAAS server, which proceeds with a new check.

If for some reasons the CASAAS server cannot be reached using the new PLMN network, the CASAAS client directs the radio module in order to pass to the next available PLMN network. As an option, the message may be sent to the CASAAS server with an error code relating to the unsuccessful attempt to join the new PLMN network.

Finally, the CASAAS server will modify its internal database accordingly in order not to leave the product in an infinite loop process for attempting to reach the new PLMN. However, the CASAAS server may send an information message to the administrator for a more thorough analysis of the inability to reach the preferred PLMN network.

The information exchanged between the CASAAS client and the CASAAS server preferably consists of frames encoded according to the ASN.1 standard.

Each element is encoded with a type, a length, the values and if necessary an end marker. This type of encoding is normally designated by the abbreviation TLV (type-length-value). This format enables the receiver of the message to decode data to the ASN.1 format even if the flow is incomplete and without having a *priori* knowledge of the size, content and semantics of the data.

The types supported are:
00: SIMID
01: MCC/MNC (PLMN)
02: level of the reception signal (usually designated by "rssi part of the CSQ (reception level)")
03: error level (usually designated by "ber part of the CSQ (error level)")
04: mode of selection by the GSM module
05: server call request FIG. 2 shows an example of a UDP signal frame sent by the CASAAS client and FIG. 3 shows an example of a UDP signal frame received by the CASAAS client.

Finally, the CASAAS server can store the list of successful and unsuccessful tries that are communicated to it by the CASAAS clients deployed in the field and thus constitute a self-supplied knowledge base that can be used to control future connections. This information may in particular be coupled to geolocation information in order to create a topography of the experiences of connection to a mobile network.

Unlike the teaching of the prior art, the terminal proceeds with the selection of the PLMN network according to its own processing operations, carried out by a client application installed and executed by the terminal, rather than according to processing operations carried out by the server of the operator. If the communicating object does not receive from the server an acknowledgement of receipt validating the IP link after the establishment of a communication from a first PLMN network, the radio module selects another available PLMN network.

What is claimed is:

1. A method for establishing a connection between a mobile communicating object and a remote server over a mobile communication network, the method comprising:
   establishing, with the communicating object, a radio connection with one of an available mobile communication network from a list of preferred mobile communication networks in order to transmit a first series of information to the remote server, the first series of information including at least a signal quality, an error rate, or a base station cell identifier;
   verifying, with the remote server, the information received and, in the event of an anomaly, engaging a procedure of dynamic modification of a selection of the mobile communication network to which the mobile communicating object is connected;
   sending, with the remote server, an acknowledgment of receipt that indicates if an internet protocol (IP) link is functioning correctly and specifies information on selection of a new mobile communication network that the mobile communicating object is to select if a preferred mobile communication network is different from the mobile communication network used to transmit the first series of information; and
   selecting, by a radio module, another available mobile communication network if the mobile communicating object does not receive an acknowledgement of receipt from the remote server validating the IP link after the establishment of a communication from a first mobile communication network from the list of preferred mobile communication networks.

2. The method of claim 1, further comprising, the remote server:
   awaiting, in standby mode, incoming messages coming from the mobile communicating object integrating a cellular radio module; and
   attempting to identify the sending mobile communicating object through the recovery of a unique serial number responsive to an incoming message being received.

3. The method of claim 2, wherein verifying comprises checking whether the identified mobile communicating object is recorded in its internal registers and whether a mobile communication network is specified as the preferred mobile communication network.

4. The method of claim 3, wherein the remote server acknowledges receipt of the incoming message in order to indicate to the communicating mobile object that the IP link is functioning correctly and that no change in network is necessary, responsive the preferred mobile communication network specified being the mobile communication network used for sending the incoming message.

5. The method of claim 3, further comprising the remote server acknowledging receipt of the incoming message in order to indicate to the mobile communicating object that the IP link is functioning correctly, and to specify information on the new mobile communication network that the mobile communicating object is to select responsive to the preferred mobile communication network specified being different from the mobile communication network used for sending the incoming message.

6. The method of claim 3, wherein the internal registers include one or more databases or files.

7. The method of claim 2, wherein the incoming messages are user data protocol (UDP) messages.

8. The method of claim 2, wherein the incoming messages and acknowledgements each include encoded frames in a type-length-value format.

9. A method of operating a remote server of a mobile communication network, the method comprising:
   receiving an incoming message over a first mobile communication network from a mobile communication device having a list of preferred mobile communication networks;
   verifying the incoming message by determining whether an anomaly occurred during transmission of the incoming message over the first network; and
   acknowledging receipt of the incoming message to indicate to the mobile communication device not to change transmissions over the first mobile communication network to a second mobile communication network responsive to the anomaly condition not being detected.

10. The method of claim 9, further comprising acknowledging receipt of the incoming message to indicate to the mobile communication device to change transmissions over the first mobile communication network to the second mobile communication network responsive to the anomaly condition being detected.

11. The method of claim 9, wherein determining whether the anomaly condition occurred includes determining whether the first mobile communication network is listed within the remote server as a most preferred mobile communication network for the mobile communication device.

12. The method of claim 9, wherein verifying the incoming message includes identifying the mobile communication device based, at least in part, by recovering a subscription identifier from the incoming message sent by the mobile communication device.

13. The method of claim 9, further comprising updating an internal database within the remote server responsive to the anomaly being detected for data exchanges using the first network.

14. A wireless communication system incorporating carrier selection as a service, the wireless communication system comprising:
   a mobile communication device comprising:
      a radio module and an antenna configured to:
         establish a connection with a remote server over a first network;
         transmit a message to the remote server, the message including an identifier corresponding to the first network being used;
         establish another connection with the remote server over a second network responsive to the first network not being validated by the remote server; and
         transmit another message to the remote server, the another message including an identifier corresponding to the second network being used.

15. The wireless communication system of claim 14, wherein the radio module and the antenna are configured to determine the first network is not validated responsive to an acknowledgement being received from the remote server indicating a different network to use for the second network.

16. The wireless communication system of claim 14, wherein the radio module and the antenna are configured to determine the first network is not validated responsive to no acknowledgement being received from the remote server such that the second selected by the radio module is a next available network available to the wireless communication device.

17. The wireless communication system of claim 14, wherein the radio module and the antenna are configured to establish the connection with, and transmit the message to, a plurality of remote servers for redundancy of validation.

18. The wireless communication system of claim 14, wherein the remote server is configured to send an acknowledgement and a demand to the mobile communication device to initiate a change to the second network.

19. The wireless communication system of claim 14, wherein the mobile communication device includes telemedicine equipment.

20. The wireless communication system of claim 19, wherein the telemedicine equipment is configured to perform at least one of the following functions: monitoring a heart rate of a person and monitoring glycemia of the person.

\* \* \* \* \*